United States Patent
Hruschka et al.

(10) Patent No.: US 7,550,616 B2
(45) Date of Patent: Jun. 23, 2009

(54) METHOD FOR THE FRACTIONATION OF OIL AND POLAR LIPID-CONTAINING NATIVE RAW MATERIALS

(75) Inventors: Steffen M. Hruschka, Oelde (DE); Stefan Kirchner, Gütersloh (DE); Jürgen Rassenhovel, Oelde (DE); Willi Witt, Tecklenburg (DE); Todd W. Gusek, Crystal, MN (US); John D. Efstathiou, Plymouth, MN (US)

(73) Assignee: Westfalia Separator AG, Oelde (DE)

( * ) Notice: Subject to any disclaimer, the term of this patent is extended or adjusted under 35 U.S.C. 154(b) by 1046 days.

(21) Appl. No.: 10/269,251

(22) Filed: Oct. 11, 2002

(65) Prior Publication Data

US 2003/0054084 A1    Mar. 20, 2003

Related U.S. Application Data

(63) Continuation of application No. PCT/IB01/00841, filed on Apr. 12, 2001.

(30) Foreign Application Priority Data

Apr. 12, 2000  (DE) ............................... 100 18 213

(51) Int. Cl.
*C11B 7/00* (2006.01)
(52) U.S. Cl. .................................. 554/207
(58) Field of Classification Search ............... 554/169; 424/365
See application file for complete search history.

(56) References Cited

U.S. PATENT DOCUMENTS

| 4,157,404 A | | 6/1979 | Yano et al. |
| 4,357,353 A | * | 11/1982 | Strauss et al. ............ 514/786 |
| 5,780,095 A | | 7/1998 | Jackeschky |
| 5,883,273 A | * | 3/1999 | Miller et al. ............ 554/169 |
| 5,917,068 A | | 6/1999 | Barnicki et al. |

FOREIGN PATENT DOCUMENTS

| CA | 1335054 | 4/1995 |
| WO | WO 93/22931 | 11/1993 |
| WO | WO 97/27274 | 7/1997 |

OTHER PUBLICATIONS

FSTA abstr., Milewski et al., Solubility of egg yolk lipids in an aqueous ethanol medium, 1978.*

* cited by examiner

*Primary Examiner*—Deborah D Carr
(74) *Attorney, Agent, or Firm*—Gauthier & Connors LLP

(57) ABSTRACT

The present invention relates to a process for the production of polar lipid-rich materials and preferably phospholipids. Preferably the polar lipid-rich materials are separated and recovered from de-oiled native raw materials by extraction with water and alcohol and use of density separation to separate the resulting mixture. The invention also includes an improved process for de-oiling the native raw material before extraction and recovery of the polar lipids.

42 Claims, 5 Drawing Sheets

METHOD FOR THE FRACTIONATION OF OIL AND POLAR LIPID-CONTAINING NATIVE RAW MATERIALS

This is a continuation of copending application(s) International Application PCT/IB01/00841 filed on 12 Apr. 2001 and which designated the U.S.

FIELD OF THE INVENTION

The present invention relates to the fields of extraction, separation and recovery, and in particular, the extraction, separation and recovery of polar lipid-rich fractions from mixtures such as native raw materials. Other fractions in the raw materials can be simultaneously recovered and these fractions, such as a protein-rich fraction, retain much or all of their original functionality because of the mild conditions utilized in the extraction process.

BACKGROUND OF THE INVENTION

Examples of polar lipids include phospholipids (e.g. phosphatidyl choline, phosphatidyl ethanolamine, phosphatidyl inositol, phosphatidyl serine, phosphatidylglycerol, diphosphatidylglycerols), cephalins, sphingolipids (sphingomyelins and glycosphingolipids), and glycoglycerolipids. Phospholipids are composed of the following major structural units: fatty acids, glycerol, phosphoric acid, amino alcohols, and carbohydrates. They are generally considered to be structural lipids, playing important roles in the structure of the membranes of plants, microbes and animals. Because of their chemical structure, polar lipids exhibit a bipolar nature, exhibiting solubility or partial solubility in both polar and non-polar solvents. The term polar lipid within the present description is not limited to natural polar lipids but also includes chemically modified polar lipids. Although the term oil has various meanings, as used herein, it will refer to the triacylglycerol fraction.

One of the important characteristics of polar lipids, and especially phospholipids, is that they commonly contain polyunsaturated fatty acids (PUFAs: fatty acids with 2 or more unsaturated bonds). In many plant, microbial and animal systems, they are especially enriched in the highly unsaturated fatty acids (HUFAs: fatty acids with 4 or more unsaturated bonds) of the omega-3 and omega-6 series. Although these highly unsaturated fatty acids are considered unstable in triacylglycerol form, they exhibit enhanced stability when incorporated in phospholipids.

The primary sources of commercial PUFA-rich phospholipids are soybeans and canola seeds. These biomaterials do not contain any appreciable amounts of HUFAs unless they have been genetically modified. The phospholipids (commonly called lecithins) are routinely recovered from these oilseeds as a by-product of the vegetable oil extraction process. For example, in the production of soybean or canola oil, the beans (seeds) are first heat-treated and then crushed, ground, and/or flaked, followed by extraction with a non-polar solvent such as hexane. Hexane removes the triacylglycerol-rich fraction from the seeds together with a varying amount of polar lipids (lecithins). The extracted oil is then de-gummed (lecithin removal) either physically or chemically as a part of the normal oil refining process and the precipitated lecithins recovered. This process however has two disadvantages: (1) the seeds must be heat-treated before extraction with hexane, both increasing the processing cost and denaturing the protein fraction, thereby decreasing its value as a by-product; and (2) the use of the non-polar solvents such as hexane also presents toxicity and flammability problems that must be dealt with.

The crude lecithin extracted in the "de-gumming" process can contain up to about 33% oil (triacylglycerols). One preferred method for separating this oil from the crude lecithin is by extraction with acetone. The oil (triacylglycerols) is soluble in acetone and the lecithin is not. The acetone solution is separated from the precipitate (lecithin) by centrifugation and the precipitate dried under first a fluidized bed drier and then a vacuum drying oven to recover the residual acetone as the product is dried. Drying temperatures of 50-70.degree. C. are commonly used. The resulting dried lecithins contain approximately 2-4% by weight of oil (triacylglycerols). Process temperatures above 70.degree. C. can lead to thermal decomposition of the phospholipids. However, even at temperatures below 70.degree. C. the presence of acetone leads to the formation of products that can impair the organoleptic quality of the phospholipids. These by-products can impart musty odors to the product and also a pungent aftertaste.

To avoid use of non-polar solvents such as hexane and avoid the negative side effects of an acetone-based process, numerous processes have also been proposed involving the use of supercritical fluids, especially supercritical $CO_2$. For example, U.S. Pat. No. 4,367,178 discloses the use of supercritical $CO_2$ to partially purify crude soy lecithin preparation by removing the oil from the preparation. German Patent Nos. DE-A 30 11 185 and DE-A 32 29 041 disclose methods for de-oiling crude lecithin with supercritical $CO_2$ and ethane respectively. Other supercritical processes have been proposed which include adding small amounts of hydrocarbons such as propane to the supercritical $CO_2$ to act as entraining agents. However, supercritical fluid extraction systems are very capital expensive and cannot be operated continuously. Further, extraction times are long and the biomaterials must be dried before extraction, and this increases the difficulties of stabilizing the resulting dry product with antioxidants. All of these factors make the supercritical process one of the most expensive options for extracting and recovering polar-lipid material or mixtures of these materials. As a result, alternative processes using extraction with liquid hydrocarbons at lower pressures have been described. For example U.S. Pat. No. 2,548,434 describes a method for de-oiling oilseed materials and recovering crude lecithin using a liquid hydrocarbon at lower pressures (35-45 bars) but elevated temperatures (79.degree. to 93.degree. C.). U.S. Pat. No. 5,597,602 describes a similar process that operates at even lower pressures and temperatures. However, even with these improvements supercritical fluid extraction remains very expensive and is not currently used to produce phospholipids for food use on a large commercial scale.

The primary commercial source of HUFA-rich polar lipids is egg yolk. Two primary methods are used for the recovery of egg phospholipids on an industrial scale. Both require the drying of the egg yolk before extraction. In the first process the dried egg yolk powder is extracted first with acetone to remove the triacylglycerols. This is then followed by an extraction with pure alcohol to recover the phospholipids. In the second process, pure alcohol is used to extract an oil/lecithin fraction from the dried egg yolk. The oil/lecithin phase is then extracted with acetone to remove the triacylglycerols, leaving behind a lecithin fraction. There are several disadvantages to both of these methods: (1) the egg yolk must first be dried before processing, an expensive step, and additionally this drying process can damage and denature the proteins, severely reducing their value as a food ingredient; (2) the alcohol and acetone concentrations used in these processes must be above 80%, and preferably higher than 90% in concentration, to be effective. Higher purity solvents are more expensive and use of high solvent concentrations leads to denaturation of the proteins, reducing their value; and (3) separate solvent recovery conditions must be available to recover two types of solvents, increasing the cost of equipment. All three of these disadvantages lead to significant increases in the costs of separating and recovering polar lipid-rich fractions from egg yolk.

Canadian Patent No. 1,335,054 describes a process for extracting fresh liquid egg yolk into protein, oil and lecithin fractions by the use of ethanol, elevated temperatures, filtration and low temperature crystallization. The process however has several disadvantages: (1) denaturation of the protein due to the use of high concentrations of ethanol; (2) the process is limited to ethanol; (3) the process removes the proteins first and then the lecithins are recovered from the oil fraction. The purity of the lecithin product is not disclosed.

In light of the current state of the art, there remains a need for an improved extraction technology for food-grade polar lipid products which is less expensive to operate, which protects the value of the associated by-products, and Which protects the overall quality of the HUFAs in the polar lipid products.

SUMMARY OF THE INVENTION

In accordance with the present invention, an improved process is provided for recovering polar lipids from native biomaterials, which does not involve all of the disadvantages of the prior art. The invention resides in a process for recovering polar lipids and/or polar lipid-containing mixtures from partially or completely de-oiled biomaterials using considerably lower alcohol concentrations than hitherto thought possible. The invention also provides an improved process for de-oiling the biomaterials prior to extraction/recovery by the methods outlined in the invention.

In accordance with one embodiment of the present invention, a process is provided for fractionation of a low-oil content, polar lipid-containing material. The process includes the steps of blending the low-oil content, polar lipid-containing material with water and a water-soluble organic solvent and subjecting the mixture to density separation (e.g., using gravity or centrifugal forces) to separate it into a light phase and a heavy phase. Preferably the light phase comprises a polar lipid-rich fraction and the heavy phase comprised a protein-rich fraction. "Low-oil content" means that the polar lipid-containing material has less than about 20% dry weight of triacylglycerols, preferably less than about 15%, more preferably less than about 10% and most preferably less than about 5%. The low-oil content, polar lipid-rich material can be obtained by removing oil from a polar lipid-rich material or by selecting a polar lipid-rich material with a low oil content. For example, some plant materials (other than oilseeds) and some microbes can be used as polar lipid-rich materials having a low oil content. Preferably, at least 60% and more preferably at least 80% of the polar lipids originally present in the low-oil content, polar lipid-containing material are recovered in a polar lipid-rich light phase.

In accordance with another embodiment of the present invention, a process for fractionation of an oil-, polar lipid-, and protein-containing mixture is provided. The process includes the steps of separating oil from the mixture to form an oil-rich fraction and a polar lipid/protein-rich fraction, adding water-soluble organic solvent to the polar lipid/protein-rich fraction, and subjecting the water-soluble organic solvent and polar lipid/protein-rich fraction to density separation, e.g., using gravity or centrifugal force, to form a polar lipid-rich fraction and a protein-rich fraction. Preferably, at least 60% and more preferably at least 80% of the polar lipids originally present in the mixture are recovered in a polar lipid-rich fraction.

In accordance with another embodiment of the present invention, a process for recovering polar lipid from a polar lipid-containing mixture employing the use of a water-soluble organic solvent, wherein the relatively high solubility of polar lipid in an aqueous solution of the water-soluble organic solvent, in which the water-soluble organic solvent comprises less than 35 percent by weight or more than 68 percent by weight of the aqueous solution, is employed to assist in the recovery.

In accordance with another embodiment of the present invention, a process for fractionation of an oil-, polar lipid-, and protein-containing mixture is provided. The process includes adding a water-soluble organic solvent to form a water-soluble organic solvent/water mixture wherein, the water-soluble organic solvent comprises from about 68% to about 98% by weight of the total water-soluble organic solvent and water present.

In accordance with another embodiment of the present invention, a process for fractionation of an oil-, polar lipid-, and protein-containing mixture is provided. The process includes maintaining the pH from a pH of 4 to a pH of about 10 during the process.

In accordance with another embodiment of the present invention, a process for fractionation of an oil-, polar lipid-, and protein-containing mixture is provided. The process includes the steps of adding water-soluble organic solvent to the oil-, polar lipid-, and protein-containing mixture, subjecting the water-soluble organic solvent and oil-, polar lipid-, and protein-containing mixture to homogenization, and separating oil from the mixture to form an oil-rich fraction and a polar lipid/protein-rich fraction.

An advantage of an embodiment of the present invention is that it is significantly less costly than other known methods. An advantage of an embodiment of the present invention is that it protects other by-products such as extracted protein from degradation increasing their value as by-products for sale. An advantage of an embodiment of the present invention is that it protects the HUFAs in the polar lipids from degradation. These advantages result from some of the key aspects of the invention: (1) the biomaterials do not need to be dried prior to de-oiling; (2) the process uses low concentrations of alcohol; (3) the quality and functionality of associated by-products are protected from degradation (e.g. denaturation of proteins by high temperatures or high solvent concentrations; oxidation of lipids; formation of unwanted by-products); and (4) the overall process is very simple (both in terms of equipment and processing steps). Preferably, the process steps are conducted under oxygen-reduced atmospheres that can include use of inert or non-reactive gases (e.g. nitrogen, carbon dioxide, argon, etc), use of solvent vapors, use of a partial or full vacuum, or any combination of the above.

BRIEF DESCRIPTION OF THE FIGURES

The present invention may be more readily understood by reference to the following figures, wherein.

DETAILED DESCRIPTION OF THE INVENTION

Because of their bipolar nature, polar lipids (including phospholipids) are of significant commercial interest as wetting and emulsifying agents. These properties may also help make HUFAs in the phospholipids more bioavailable, in addition to enhancing their stability. These properties make phospholipids ideal forms of ingredients for use in nutritional supplements, food, infant formula and pharmaceutical applications.

Figure 1:
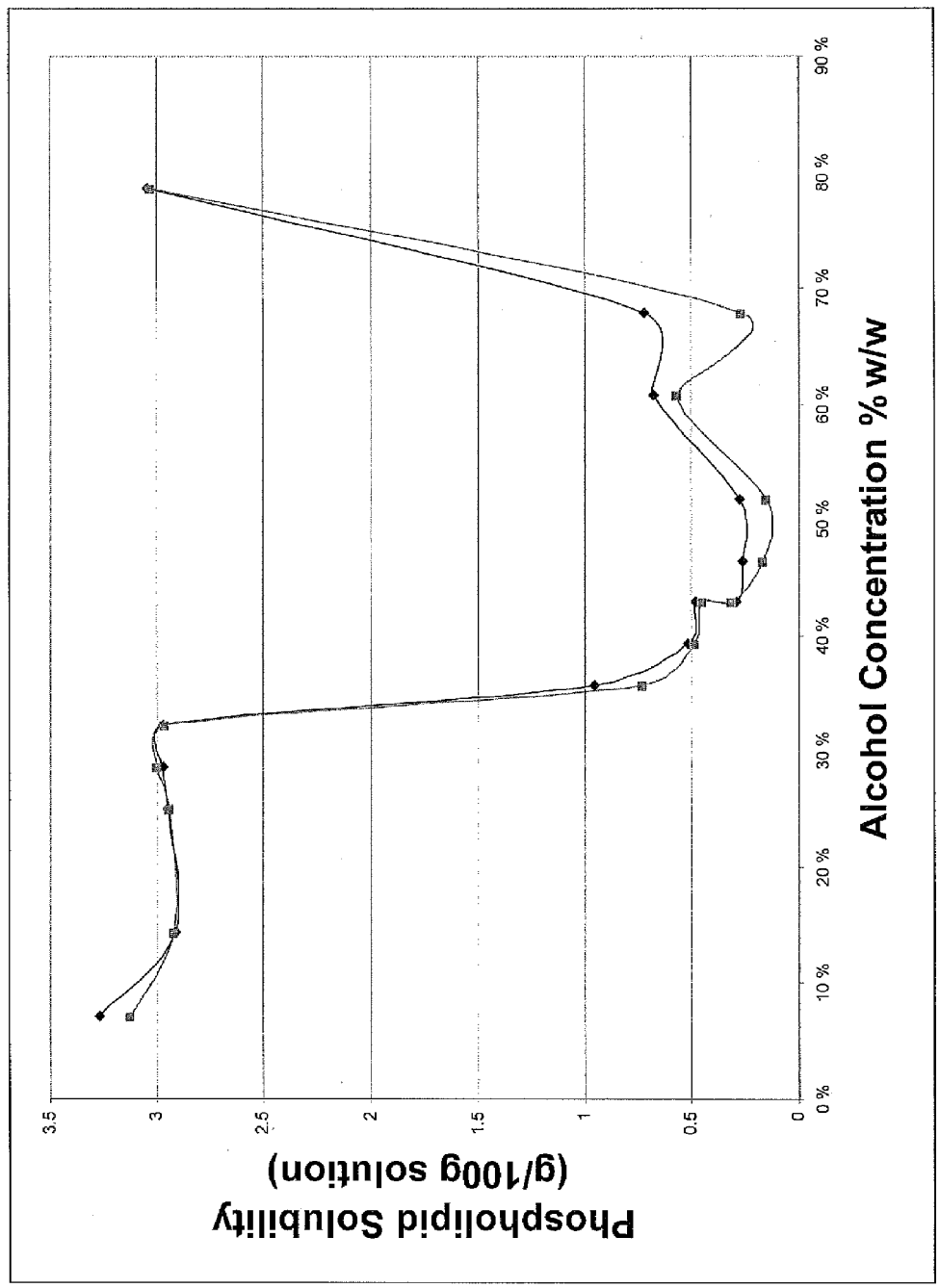
FIG. 1 is a graphical representation of the solubility of phospholipids, a form of polar lipids, as a function of alcohol concentration.

We have unexpectedly found that polar lipids are very soluble not only in high alcohol concentrations (e.g. at alcohol concentrations greater than about 6S %) but also in low alcohol concentrations (less than about 35% alcohol) (FIG. 1). For the purpose of this invention, phospholipids are described as "soluble" if they do not settle or separate from the continuous phase (sometimes also called supernatant or light phase) when subjected to centrifugation by the types of equipment described in this application. In the alcohol concentration range from about 35% w/w to about 6S % w/w alcohol, polar lipids exhibit significantly lower solubility. The present invention exploits this property of polar lipids (enhanced solubility/dispersibility at low alcohol concentrations) which can then be exploited in several ways to develop processes for inexpensively extracting and recovering polar lipids, and especially phospholipids, from native biomaterials.

Native biomaterials that are rich in HUFA-containing polar lipids include fish, crustaceans, microbes, eggs, brain tissue, milk, meat and plant material including oilseeds. As used herein, the terms fish, crustaceans, microbes, eggs, brain tissue, milk, meat and plant material including oilseeds will include genetically modified versions thereof. The content of phospholipids in these materials is generally low usually ranging from 0.1% to about 4% by wet weight. As a result large amounts of raw materials need to be processed to recover these phospholipids. Because of the high costs of prior extraction techniques, phospholipids and especially HUFA-enriched phospholipids were very expensive and therefore restricted to use in the infant formula, pharmaceutical and cosmetic industries. One of the advantages of the present invention is that it provides for the extraction of polar lipids, and in particular phospholipids, in a cost-effective manner.

Figure 2:
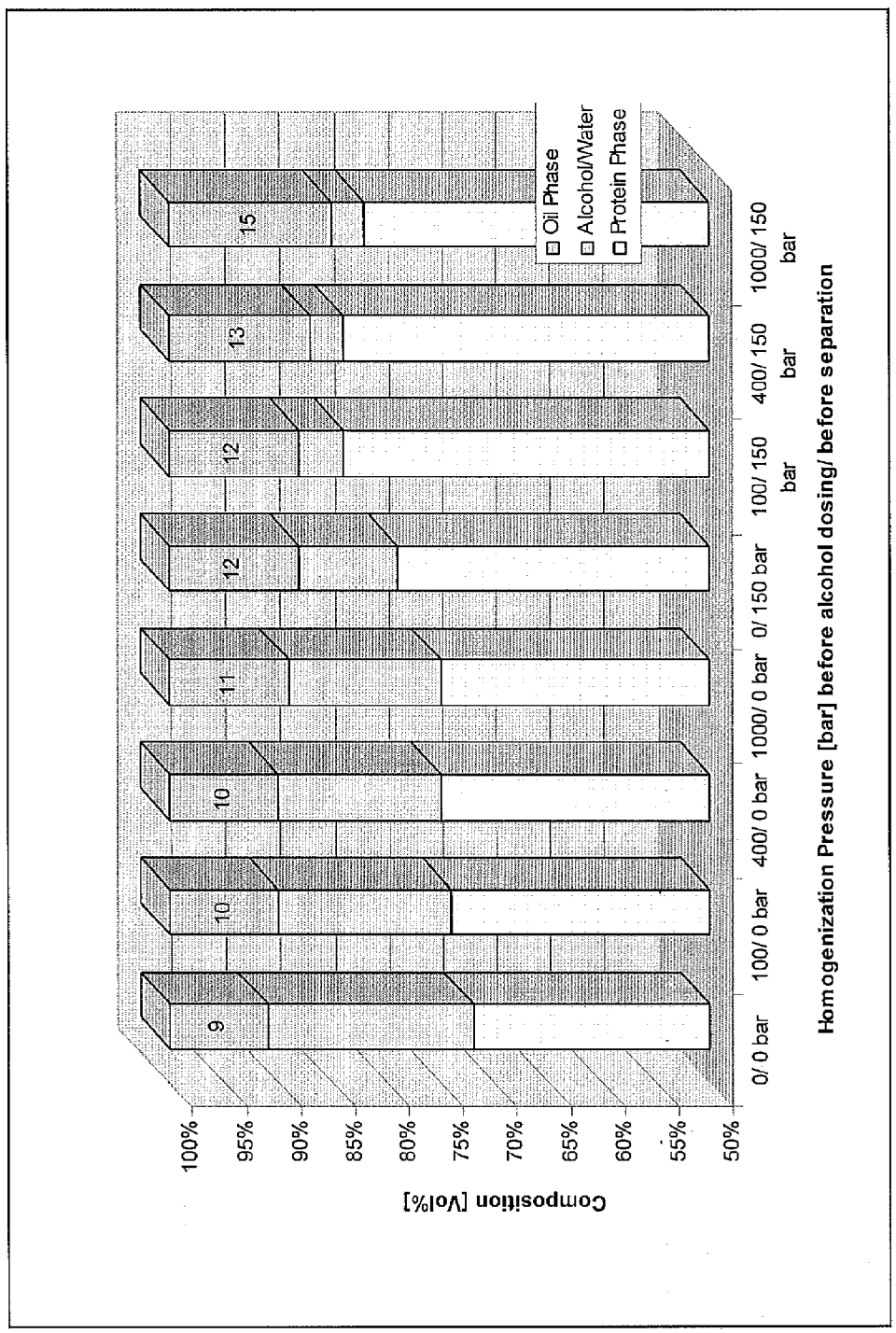
FIG. 2 is a graphical representation of the effect of homogenization on the de-oiling of egg yolk.

In the first step of one embodiment of the process of the present invention, a low-oil content material is selected or the material is de-oiled by any suitable de-oiling process, but preferably by a de-oiling process that does not cause denaturation of the proteins. This would include processes that do not utilize high temperatures (e.g. greater than about 65.degree. C.) or high concentrations of solvents (e.g. greater than about 50%). Preferably the de-oiling process outlined in WO 96/05278 (U.S. Pat. No. 5,928,696) is utilized. Preferably, a key change is made to this de-oiling process. We have unexpectedly found that homogenizing the biomaterial prior to addition of the alcohol and water, or homogenization after the addition of the alcohol and water, but most preferably homogenization both prior to and after addition of alcohol and water, leads to improvements in oil recovery up to 85% higher than without homogenization (FIG. 2). As used herein, homogenization can include any high shear process such as processing the mixture under pressure through a small orifice, using a colloidal mill, or other high shear process, etc. Preferably, when the mixture is forced through a small orifice, the homogenization is conducted at pressures from about 100 bars to about 1000 bars, and more preferably from about 150 bars to about 350 bars. This is an unexpected result, as one skilled in the art would expect that homogenization of this type of mixture would lead to formation of very strong emulsions which would be very difficult to break, making the process less efficient.

Figure 3:
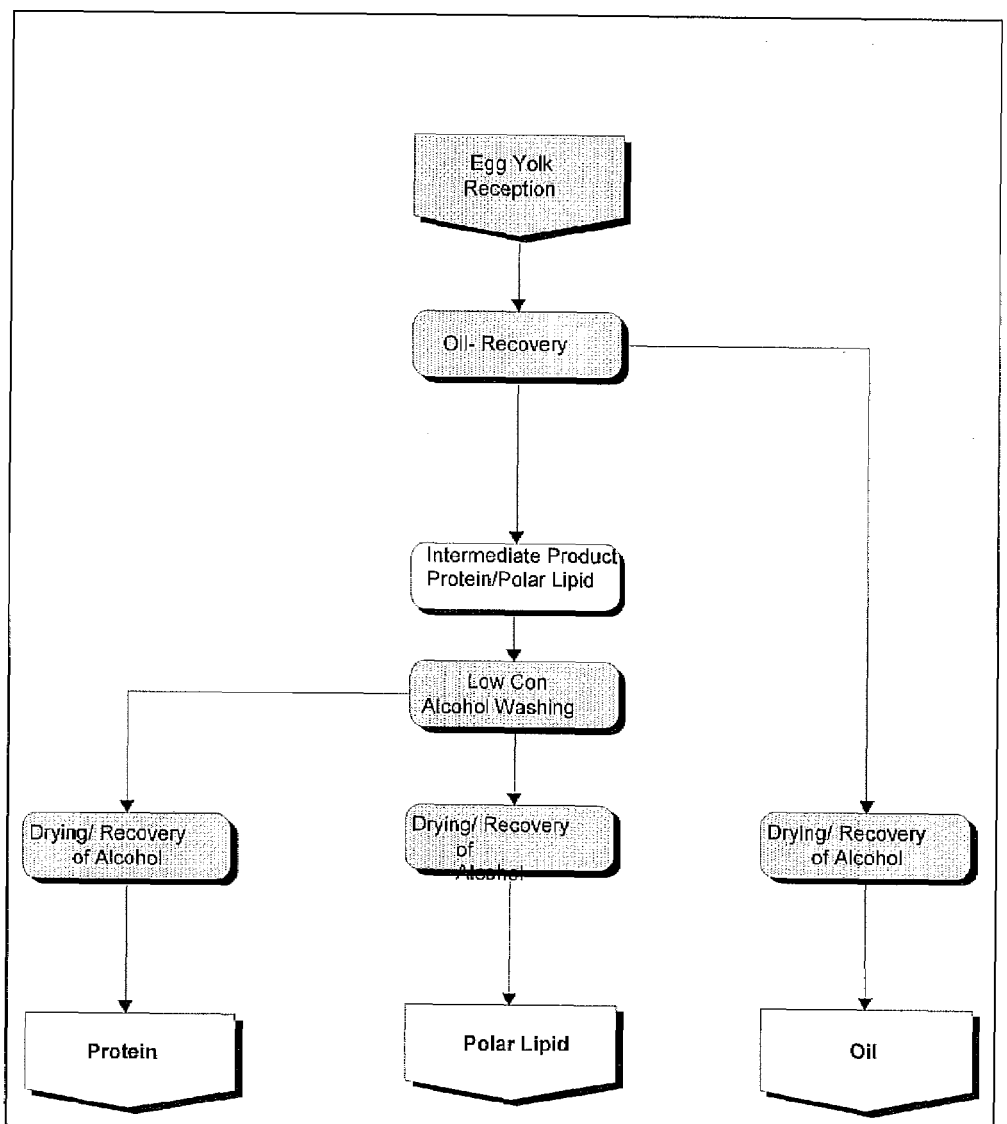
FIG. 3 is a graphical representation of a phospholipid extraction process (as an example of a polar lipid extraction process) based on a low concentration of alcohol.
Figure 4:
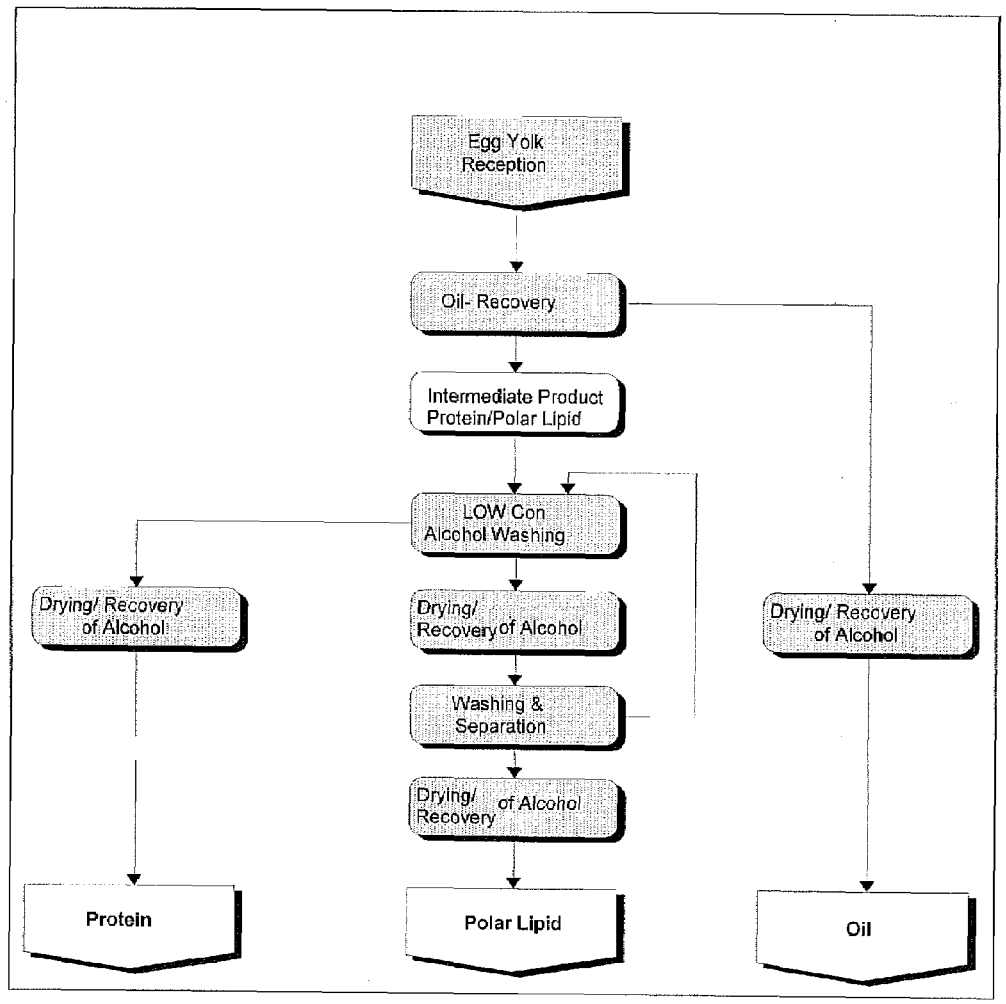
FIG. 4 is a graphical representation of a phospholipid extraction process (as an example of a polar lipid extraction process) based on a low concentration of alcohol but with the additional step of polishing the phospholipids with a step utilizing a high concentration of alcohol.
Figure 5:
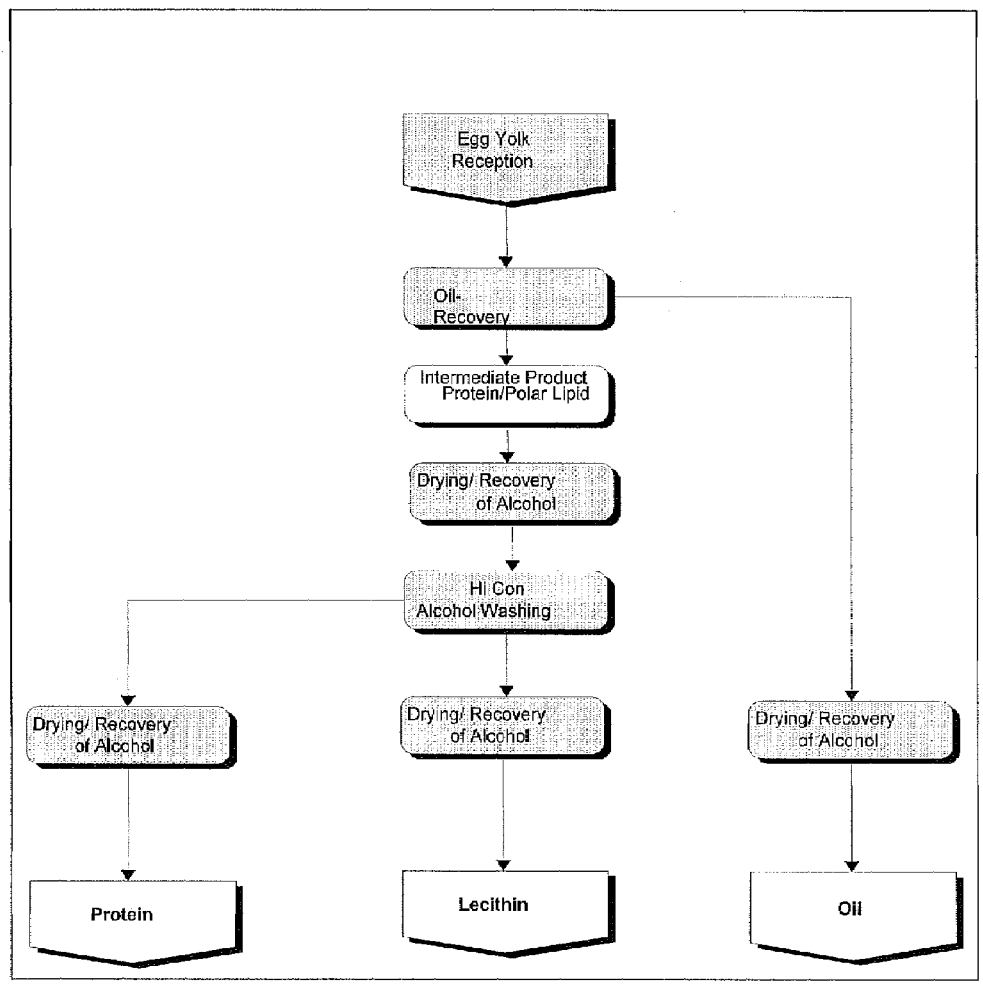
FIG. 5 is a graphical representation of a phospholipid extraction (as an example of a polar lipid extraction process) process based on using a high concentration of alcohol throughout the phospholipid recovery portion of the extraction process.

A lecithin recovery process utilizing low concentrations of alcohol throughout the entire process is outlined in FIG. 3. Liquid egg yolk is used as the polar-lipid rich biomaterial in this example. It is understood, however, that other polar lipid-containing biomaterials (e.g. fish, crustaceans, microbes, brain tissue, milk, meat and plant material including oilseeds) could also be processed in a similar manner with minor modifications to the process. In the first step of the process, the material is de-oiled by any well-known de-oiling process, but preferably by a de-oiling process that does not cause denaturation of the proteins. For a more efficient recovery of the oil, the material is sheared by means of homogenization to break up the fat-containing cellular particles so that the oil in the particles can be separated as well as the free oil in the biomaterial. Alcohol and water are then added to the yolk and the mixture is re-homogenized. The concentration of alcohol in the aqueous solution can be from about 5 to about 35% w/w, preferably from about 20 to about 35% w/w, and most preferably from about 25 to about 30% w/w. The free oil is then separated by means of centrifugal force due to a difference in density. This results in two fractions being recovered: (1) a fraction with approximately 50-70% protein (as % dry weight) and about 30-50% dry weight as polar lipids, the mixture containing a significantly lower cholesterol content that the egg yolk; and (2) an egg oil with approximately 85% of the triacylglycerols of the egg yolk. Additional dosing of the protein/lecithin fraction with low concentration alcohol disperses the lecithin that is then separated from the protein by means of centrifugal force. Counter-current washing/centrifugation or cross-current washing/separation of the protein and lecithin products can be employed to improve the purity of the products and economics of the overall process. The protein is not denatured in this process and retains high resale value (because of its functionality) as a by-product of the process thereby reducing overall costs of all products produced.

Because of the simplicity of the equipment required in the process, the entire process can very easily be conducted under a reduced-oxygen atmosphere (e.g., nitrogen, a preferred embodiment of the process), further protecting any HUFAs in the polar lipids from oxidation. For example, a gas tight decanter can be used to separate oil from the mixture. A suitable decanter is model CA 226-28 Gas Tight available from Westfalia Separator Industry GmbH of Oelde Germany, which is capable of continuous separation of oil from suspensions with high solids content in a centrifugal field. A gas tight separator useful for separating polar lipids from proteins is model SC 6-06-576 Gas Tight available from Westfalia Separator Industry GmbH of Oelde Germany, which is capable of continuous separation of solids from suspensions with high solids content in a centrifugal field.

An improved version of this process has also been developed. In this process the de-oiling and lecithin washing steps employing low alcohol concentrations are similar to the process outlined above. However after the lecithin phase is dried, it is washed with concentrated alcohol. Since proteins are not soluble in high concentrations of alcohol, they precipitate (while the lecithin dissolves) and the precipitated proteins are separated by density separation, e.g., using gravity or centrifugal force. The protein-reduced lecithin is then concentrated by means of evaporation of water and alcohol. The advantage of this variation of the process is that it provides options for the production of both higher and lower quality lecithin fractions, and in providing the higher quality lecithin, only a very small portion of the protein is denatured.

The process has also been modified for use of high concentrations of alcohol after the de-oiling step. The process steps after de-oiling the biomaterials are similar to the low alcohol concentration process, but instead of diluted alcohol, concentrated alcohol is added. After de-oiling, concentration and drying of the polar lipid/protein intermediate product takes place. The concentration/drying step is necessary to reduce the amount of concentrated alcohol necessary to be added to re-dissolve the polar lipids. The dried polar lipid/protein phase is washed with concentrated alcohol and the protein precipitates. The precipitated protein is separated by density separation, e.g., using gravity or centrifugal force, in a counter-current washing system. The protein-reduced polar lipids are concentrated by means of evaporation of alcohol and water. The advantage of this process is that it requires lower thermal energy inputs. The major disadvantage is that all of the protein is denatured and is of lower value.

While not wishing to be bound by any theory, it is believed that several of the underlying mechanisms in the processes above are as discussed in further detail below. With regard to homogenization it is believed that destruction of cellular material occurs here. An objective is to achieve homogeneous distribution of all components, i.e., to create a homogeneous polydisperse system (protein, oil, lipoproteins, continuous phase water), so that, when aqueous or pure alcohol is added, this can immediately be uniformly, i.e., homogeneously, distributed without causing local irreversible protein denaturation. The temperature is to be kept as low as possible, so that as little lecithin as possible is dissolved in the oil phase. The pressure employed in the homogenization process should preferably be less than 1000 bars, and more preferably less than 600 bars, in order to destroy the quaternary and tertiary structure of the proteins, but not the primary and secondary structure. The concentration of alcohol is preferably less than 30% w/w, more preferably about 28%. An unduly low alcohol concentration can lead to significant protein swelling, so that the free smaller fat globules can be incorporated in the protein. The percentage of fats bonded in the form of lipoproteins is not further considered here, since it may not interfere with liberation of the polar lipids (phospholipids).

In principle, it is believed that the higher the alcohol concentration, the stronger the protein contraction, but the more nonpolar the aqueous phase, more polar lipids may be dissolved in the oil phase. The appropriate concentration and temperature must therefore be found, for example, by conducting a few preliminary experiments (centrifuge tests), for each raw material.

Taking into consideration the natural moisture content of the raw material, aqueous alcohol is added to produce preferred final alcohol concentrations of about 25-30%, and the dispersion is homogenized again. The contracted protein molecules and fat droplets are separated from each other. The intermediate layer between both, the polar lipid layer present on the surface of the fat globules, is thus disrupted. The oil therefore has an easier opportunity to be present as free phase in the dispersion. In order to reestablish equilibrium in this oil-in-water emulsion, on the one hand, the polar lipid could surround the fat globules again or, on the other hand, the oil droplets could coagulate to larger drops. For this purpose, the additional force of the centrifugal field is employed. The now larger oil drops can then coalesce, i.e., forming a separable, continuous phase.

The procedure with a homogenizer is surprising for one skilled in the art as this produces very small oil droplets. In past methods, oil droplets were not reduced in size before being separated, because the degree of emulsion increases due to the larger internal surface area. Quite the contrary, agitation or kneading was carefully carried out, so that the oil can coagulate into larger drops. Heat was helpful in this malaxation process in order to also reduce the viscosity, among other things. The surprising effect that more oil can also be separated by a homogenization pressure increase to about 300 bars or more may be explained by the interactions of the proteins, polar lipids and oil (actually, the nonpolar lipid phase) with the solvent layer.

Oil separation must therefore occur so that in general the surface tension and surface state of the droplets (destroyed as a result of shear) regain their original equilibrium. This means the homogenized slurry is preferably introduced immediately into a density separation device (preferably, a centrifuge of appropriate design and geometric considerations) and separated there into non-polar lipids (oil), and polar lipids with protein, water and alcohol. The viscosity reduction is not necessary to the degree it is necessary in oil recovery without homogenization (as described in WO 96/05278). Direct transfer of the homogenized slurry into the centrifugal field can be important in order to support coalescence.

After one- or two-stage oil separation, preferably in a decanter (other types of density separation devices, including centrifuges, are also successfully used for this purpose), all free oil fractions (lipids and nonpolar lipids) are ideally separated so that, by subsequent reduction of the alcohol concentration with water in the protein phase, no oil droplets are found in the free water/alcohol phase, although the polarity of the mixture is increased and lecithin is therefore bonded again in this phase and the oil therefore "liberated". Normally, the oil in this polar lipid/protein/alcohol mixture becomes free when the alcohol concentration is reduced; i.e., the oil solubility diminishes in the polar lipid phase. It was surprisingly found that, after two-fold homogenization and centrifuging, very little free oil was centrifugable, even if the alcohol concentration was only 15%.

Sterols including cholesterol may have a greater affinity for the polar lipid phase than for the oil phase, resulting in a higher sterol content in the polar lipid phase than in the oil phase. Movement of sterols into the oil or polar lipid phases can be manipulated by changing the pH of the mixture, altering temperature or by addition of processing aids such as salts to increase or decrease the polar nature of the aqueous phase. Another method to reduce the cholesterol in the polar lipid-rich fraction is to add oil with little or no cholesterol to the polar lipid-rich fraction and repeat the de-oiling process. In this way, the cholesterol can be segregated into the oil phase. The pH during processing is from pH 4 to about pH 10.

EXAMPLE 1

Low Alcohol Extraction Process: One hundred kilograms of liquid egg yolk (containing 42 kg dry substance) was homogenized and then ethanol (35.4 kg of 96% purity) and 30.7 kg water were added to the egg yolk. The resulting alcohol concentration was about 20% w/w overall (27% w/w referring only to alcohol and water). The mixture was then re-homogenized and the mixture was centrifuged using a decanter centrifuge yielding an oil phase and an alcohol/water phase. This de-oiling step yielded 17 kg egg yolk oil and 149 kg of the alcohol/water phase. The alcohol/water phase was then washed 3 times with the same low concentration of alcohol using a counter-current wash process employing a separator centrifuge. The process yielded two fractions: (1) a phospholipid-rich fraction (the liquid phase) which was dried to yield a product containing a total of 17 kg dry substance (containing 8 kg of phospholipid); and (2) a protein-rich fraction which was dried to yield 12 kg of dry substance (containing 11 kg or protein and 0.3 kg of phospholipid). Using an approximate average weight of 16.0 g per yolk, each containing about 1.7 g phospholipid per yolk, 100 kg egg yolk should yield approximately 10.6 kg of phospholipids. The 8.0 kg of phospholipids recovered in the phospholipid-rich fraction by this process represented a recovery efficiency for the phospholipid fraction of approximately 76%.

EXAMPLE 2

Low Alcohol Extraction Process with High Alcohol Polishing Step: One hundred kilograms of liquid ego yolk (containing 42 kg dry substance) was homogenized and then ethanol and water were added to bring the mixture to a final alcohol concentration of 30% w/w in the alcohol/water phase. The mixture was then re-homogenized and the mixture was centrifuged using a decanter centrifuge yielding an oil phase and an alcohol/water phase. This de-oiling step yielded 16 kg egg yolk oil and 134 kg of the alcohol/water phase containing 26 kg dry substance. Seventy-two kg of ethanol and 170 kg water were then added to the alcohol/water phase, which was then mixed and centrifuged through a separator centrifuge. This yielded two fractions: (1) the liquid phase (299 kg) which contained 11 kg dry substance and (2) the solid phase (78 kg) which contained 15 kg dry substance. Fraction 1 contained the phospholipids with a small amount of proteins and Fraction 2 contained primarily proteins. Fraction 1 was then dried to a weight of 11.2 kg and 20 kg ethanol (96%) was added to this fraction. The mixture was then processed through a separator centrifuge yielding a liquid phase containing 10 kg dry substance. The liquid phase was then dried yielding a final weight of 10.5 kg (10.0 kg dry substance—the phospholipid fraction). The 78 kg solids in Fraction 2 were also dried resulting in 16 kg total (or 15 kg dry substance—the protein fraction). Using an approximate average weight of 16.0 g per yolk, each containing about 1.7 g phospholipid per yolk, 100 kg egg yolk should yield approximately 10.6 kg of phospholipids. The 10.0 kg of phospholipids recovered in this process represents a minimal recovery efficiency for the phospholipid fraction of greater than approximately 90%.

EXAMPLE 3

Low Alcohol De-Oiling Process with High Alcohol Polar Lipid Extraction Process: One hundred kilograms of liquid egg yolk (containing 45 kg dry substance) was homogenized and then ethanol and water were added to bring the mixture to a final alcohol concentration of 30% w/w in the alcohol/water phase. The mixture was then re-homogenized and the mixture was centrifuged using a decanter centrifuge yielding an oil phase and an alcohol/water phase. This de-oiling step yielded 17 kg egg yolk oil and 139 kg of the alcohol/water phase containing 28 kg dry substance. The alcohol/water phase was then dried (recovering 109 kg alcohol and water) yielding 30 kg material (containing 28 kg dry substance). Ninety kg ethanol (96% purity) was then added to this material and the mixture processed through a separator centrifuge yielding a liquid phase (containing the phospholipids) and a solid phase containing the proteins. The liquid phase (80 kg total containing 10.4 kg dry substance) was dried resulting in 10.6 kg of product containing 10.4 kg dry substance (phospholipids). The solid phase (40 kg total) was dried yielding 18.5 kg of product—protein (containing 17.6 kg of dry substance). Using an approximate average weight of 16.0 g per yolk, each containing about 1.7 g phospholipid per yolk, 100 kg egg yolk should yield approximately 10.6 kg of phospholipids. The 10.4 kg of phospholipids recovered in this process represents a minimum recovery efficiency for the phospholipid fraction of greater than approximately 90%.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

We claim:

1. A process for fractionation of an oil-, polar lipid-, and protein-containing mixture, comprising the steps:
    (a) separating oil from said mixture to form an oil-rich fraction and a polar lipid/protein-rich fraction;
    (b) adding water-soluble organic solvent to said polar lipid/protein-rich fraction;
    (c) subjecting the water-soluble organic solvent and polar lipid/protein-rich fraction to density separation to form a polar lipid-rich fraction and a protein-rich fraction;
    wherein the separation of oil of step (a) comprises the steps:
    (a-1) homogenization of said oil-, polar lipid-, and protein-containing mixture;

(b-1) adding water-soluble organic solvent and water to said mixture;
(c-1) separating the resulting mixture into an oil-rich fraction and a polar lipid/protein-rich fraction and;
wherein said polar lipid/protein-rich fraction formed in step (a) comprises from about 30% to about 50% by weight polar lipid and from about 50% to about 70% by weight protein.

2. A process for fractionation of an oil-, polar lipid-, and protein-containing mixture, comprising the steps:
(a) separating oil from said mixture to form an oil-rich fraction and a polar lipid/protein-rich fraction;
(b) adding water-soluble organic solvent to said polar lipid/protein-rich fraction;
(c) subjecting the water-soluble organic solvent and polar lipid/protein-rich fraction to density separation to form a polar lipid-rich fraction and a protein-rich fraction;
wherein the separation of oil of step (a) comprises the steps:
(a-1) homogenization of said oil-, polar lipid-, and protein-containing mixture;
(b-1) adding water-soluble organic solvent and water to said mixture;
(c-1) separating the resulting mixture into an oil-rich fraction and a polar lipid/protein-rich fraction and;
wherein said oil-rich fraction formed in step (a) comprises from about 75% to about 95% by weight triacylglycerols.

3. A process for fractionation of an oil-, polar lipid-, and protein-containing mixture, comprising the steps:
(a) separating oil from said mixture to form an oil-rich fraction and a polar lipid/protein-rich fraction;
(b) adding water-soluble organic solvent to said polar lipid/protein-rich fraction;
(c) subjecting the water-soluble organic solvent and polar lipid/protein-rich fraction to density separation to form a polar lipid-rich fraction and a protein-rich fraction;
wherein the separation of oil of step (a) comprises the steps: (a-1) homogenization of said oil-, polar lipid-, and protein-containing mixture;
(b-1) adding water-soluble organic solvent and water to said mixture;
(c-1) separating the resulting mixture into an oil-rich fraction and a polar lipid/protein-rich fraction and;
wherein said oil-, polar lipid-, and protein-containing mixture further comprises cholesterol and a substantial amount of said cholesterol reports to said oil-rich fraction pursuant to the separation of step (a).

4. A process for fractionation of an oil-, polar lipid-, and protein-containing mixture, comprising the steps:
(a) separating oil from said mixture to form an oil-rich fraction and a polar lipid/protein-rich fraction;
(b) adding water-soluble organic solvent to said polar lipid/protein-rich fraction;
(c) subjecting the water-soluble organic solvent and polar lipid/protein-rich fraction to density separation to form a polar lipid-rich fraction and a protein-rich fraction;
wherein the separation of oil of step (a) comprises the steps:
(a-1) homogenization of said oil-, polar lipid-, and protein-containing mixture;
(b-1) adding water-soluble organic solvent and water to said mixture;
(c-1) separating the resulting mixture into an oil-rich fraction and a polar lipid/protein-rich fraction and;
wherein said polar lipid-rich fraction is dried to recover water-soluble organic solvent, washed with a water-soluble organic solvent/water mixture comprising greater than about 80% by weight water-soluble organic solvent in order to precipitate residual protein and further dried to recover the water-soluble organic solvent.

5. A process for fractionation of an oil-, polar lipid-, and protein-containing mixture, comprising the steps:
(a) separating oil from said mixture to form an oil-rich fraction and a polar lipid/protein-rich fraction;
(b) adding water-soluble organic solvent to said polar lipid/protein-rich fraction;
(c) subjecting the water-soluble organic solvent and polar lipid/protein-rich fraction to density separation to form a polar lipid-rich fraction and a protein-rich fraction;
wherein the separation of oil of step (a) comprises the steps:
(a-1) homogenization of said oil-, polar lipid-, and protein-containing mixture;
(b-1) adding water-soluble organic solvent and water to said mixture;
(c-1) separating the resulting mixture into an oil-rich fraction and a polar lipid/protein-rich fraction and;
wherein the addition of said water-soluble organic solvent results in the precipitation of at least some of said protein, which is recovered by density separation.

6. A process for fractionation of an oil-, polar lipid-, and protein-containing mixture, comprising the steps:
(a) separating oil from said mixture to form an oil-rich fraction and a polar lipid/protein-rich fraction;
(b) adding water-soluble organic solvent to said polar lipid/protein-rich fraction;
(c) subjecting the water-soluble organic solvent and polar lipid/protein-rich fraction to density separation to form a polar lipid-rich fraction and a protein-rich fraction;
wherein the separation of oil of step (a) comprises the steps:
(a-1) homogenization of said oil-, polar lipid-, and protein-containing mixture;
(b-1) adding water-soluble organic solvent and water to said mixture;
(c-1) separating the resulting mixture into an oil-rich fraction and a polar lipid/protein-rich fraction and;
wherein residual protein is removed from said polar lipid-rich fraction by the addition of water.

7. A process for fractionation of an oil-, polar lipid-, and protein-containing mixture, comprising the steps:
(a) separating oil from said mixture to form an oil-rich fraction and a polar lipid/protein-rich fraction;
(b) adding water-soluble organic solvent to said polar lipid/protein-rich fraction;
(c) subjecting the water-soluble organic solvent and polar lipid/protein-rich fraction to density separation to form a polar lipid-rich fraction and a protein-rich fraction and;
wherein the pH during processing is from pH 4 to about pH 10.

8. A process for fractionation of an oil-, polar lipid-, and protein-containing mixture, comprising the steps:
(a) separating oil from said mixture to form an oil-rich fraction and a polar lipid/protein-rich fraction;
(b) adding water-soluble organic solvent to said polar lipid/protein-rich fraction;
(c) subjecting the water-soluble organic solvent and polar lipid/protein-rich fraction to density separation to form a polar lipid-rich fraction and a protein-rich fraction and;
wherein said homogenization is conducted at a pressure from about 100 bars to about 1000 bars.

9. A process for fractionation of an oil-, polar lipid-, and protein-containing mixture, comprising the steps:

(a) separating oil from said mixture to form an oil-rich fraction and a polar lipid/protein-rich fraction;
(b) adding water-soluble organic solvent to said polar lipid/protein-rich fraction;
(c) subjecting the water-soluble organic solvent and polar lipid/protein-rich fraction to density separation to form a polar lipid-rich fraction and a protein-rich fraction;
wherein the separation of oil of step (a) comprises the steps:
(a-1) homogenization of said oil-, polar lipid-, and protein-containing mixture;
(b-1) adding water-soluble organic solvent and water to said mixture;
(c-1) separating the resulting mixture into an oil-rich fraction and a polar lipid/protein-rich fraction and;
wherein said homogenization is conducted at a pressure from about 150 bars to about 350 bars.

10. A process for fractionation of an oil-, polar lipid-, and protein-containing mixture, comprising the steps:
(a) separating oil from said mixture to form an oil-rich fraction and a polar lipid/protein-rich fraction;
(b) adding water-soluble organic solvent to said polar lipid/protein-rich fraction;
(c) subjecting the water-soluble organic solvent and polar lipid/protein-rich fraction to density separation to form a polar lipid-rich fraction and a protein-rich fraction;
wherein the separation of oil of step (a) comprises the steps:
(a-1) adding water-soluble organic solvent and water to said mixture;
(b-1) homogenization of said oil-, polar lipid-, and protein-containing mixture
(c-1) separating the resulting mixture into an oil-rich fraction and a polar lipid/protein-rich fraction and;
wherein said polar lipid/protein-rich fraction formed in step (a) comprises from about 30% to about 50% by weight polar lipid and from about 50% to about 70% by weight protein.

11. A process for fractionation of an oil-, polar lipid-, and protein-containing mixture, comprising the steps:
(a) separating oil from said mixture to form an oil-rich fraction and a polar lipid/protein-rich fraction;
(b) adding water-soluble organic solvent to said polar lipid/protein-rich fraction;
(c) subjecting the water-soluble organic solvent and polar lipid/protein-rich fraction to density separation to form a polar lipid-rich fraction and a protein-rich fraction;
wherein the separation of oil of step (a) comprises the steps:
(a-1) adding water-soluble organic solvent and water to said mixture;
(b-1) homogenization of said oil-, polar lipid-, and protein-containing mixture
(c-1) separating the resulting mixture into an oil-rich fraction and a polar lipid/protein-rich fraction and;
wherein said oil-rich fraction formed in step (a) comprises from about 75% to about 95% by weight triacylglycerols.

12. A process for fractionation of an oil-, polar lipid-, and protein-containing mixture, comprising the steps:
(a) separating oil from said mixture to form an oil-rich fraction and a polar lipid/protein-rich fraction;
(b) adding water-soluble organic solvent to said polar lipid/protein-rich fraction;
(c) subjecting the water-soluble organic solvent and polar lipid/protein-rich fraction to density separation to form a polar lipid-rich fraction and a protein-rich fraction;
wherein the separation of oil of step (a) comprises the steps:
(a-1) adding water-soluble organic solvent and water to said mixture;
(b-1) homogenization of said oil-, polar lipid-, and protein-containing mixture
(c-1) separating the resulting mixture into an oil-rich fraction and a polar lipid/protein-rich fraction and;
wherein said oil-, polar lipid-, and protein-containing mixture further comprises cholesterol and a substantial amount of said cholesterol reports to said oil-rich fraction pursuant to the separation of step (a).

13. A process for fractionation of an oil-, polar lipid-, and protein-containing mixture, comprising the steps:
(a) separating oil from said mixture to form an oil-rich fraction and a polar lipid/protein-rich fraction;
(b) adding water-soluble organic solvent to said polar lipid/protein-rich fraction;
(c) subjecting the water-soluble organic solvent and polar lipid/protein-rich fraction to density separation to form a polar lipid-rich fraction and a protein-rich fraction;
wherein the separation of oil of step (a) comprises the steps:
(a-1) adding water-soluble organic solvent and water to said mixture;
(b-1) homogenization of said oil-, polar lipid-, and protein-containing mixture
(c-1) separating the resulting mixture into an oil-rich fraction and a polar lipid/protein-rich fraction and;
wherein said polar lipid-rich fraction is dried to recover water-soluble organic solvent, washed with a water-soluble organic solvent/water mixture comprising greater than about 80% by weight water-soluble organic solvent in order to precipitate residual protein and further dried to recover the water-soluble organic solvent.

14. A process for fractionation of an oil-, polar lipid-, and protein-containing mixture, comprising the steps:
(a) separating oil from said mixture to form an oil-rich fraction and a polar lipid/protein-rich fraction;
(b) adding water-soluble organic solvent to said polar lipid/protein-rich fraction;
(c) subjecting the water-soluble organic solvent and polar lipid/protein-rich fraction to density separation to form a polar lipid-rich fraction and a protein-rich fraction;
wherein the separation of oil of step (a) comprises the steps:
(a-1) adding water-soluble organic solvent and water to said mixture;
(b-1) homogenization of said oil-, polar lipid-, and protein-containing mixture;
(c-1) separating the resulting mixture into an oil-rich fraction and a polar lipid/protein-rich fraction and;
wherein the addition of said water-soluble organic solvent results in the precipitation of at least some of said protein, which is recovered by density separation.

15. A process for fractionation of an oil-, polar lipid-, and protein-containing mixture, comprising the steps:
(a) separating oil from said mixture to form an oil-rich fraction and a polar lipid/protein-rich fraction;
(b) adding water-soluble organic solvent to said polar lipid/protein-rich fraction;
(c) subjecting the water-soluble organic solvent and polar lipid/protein-rich fraction to density separation to form a polar lipid-rich fraction and a protein-rich fraction;
wherein the separation of oil of step (a) comprises the steps:

(a-1) adding water-soluble organic solvent and water to said mixture;
(b-1) homogenization of said oil-, polar lipid-, and protein-containing mixture
(c-1) separating the resulting mixture into an oil-rich fraction and a polar lipid/protein-rich fraction and;
wherein residual protein is removed from said polar lipid-rich fraction by the addition of water.

16. A process for fractionation of an oil-, polar lipid-, and protein-containing mixture, comprising the steps:
   (a) separating oil from said mixture to form an oil-rich fraction and a polar lipid/protein-rich fraction;
   (b) adding water-soluble organic solvent to said polar lipid/protein-rich fraction;
   (c) subjecting the water-soluble organic solvent and polar lipid/protein-rich fraction to density separation to form a polar lipid-rich fraction and a protein-rich fraction;
   wherein the separation of oil of step (a) comprises the steps:
   (a-1) adding water-soluble organic solvent and water to said mixture;
   (b-1) homogenization of said oil-, polar lipid-, and protein-containing mixture;
   (c-1) separating the resulting mixture into an oil-rich fraction and a polar lipid/protein-rich fraction and;
   wherein the pH during processing is from pH 4 to about pH 10.

17. A process for fractionation of an oil-, polar lipid-, and protein-containing mixture, comprising the steps:
   (a) separating oil from said mixture to form an oil-rich fraction and a polar lipid/protein-rich fraction;
   (b) adding water-soluble organic solvent to said polar lipid/protein-rich fraction;
   (c) subjecting the water-soluble organic solvent and polar lipid/protein-rich fraction to density separation to form a polar lipid-rich fraction and a protein-rich fraction and;
   wherein said homogenization is conducted at a pressure from about 100 bars to about 1000 bars.

18. A process for fractionation of an oil-, polar lipid-, and protein-containing mixture, comprising the steps:
   (a) separating oil from said mixture to form an oil-rich fraction and a polar lipid/protein-rich fraction;
   (b) adding water-soluble organic solvent to said polar lipid/protein-rich fraction;
   (c) subjecting the water-soluble organic solvent and polar lipid/protein-rich fraction to density separation to form a polar lipid-rich fraction and a protein-rich fraction and;
   wherein said homogenization is conducted at a pressure from about 150 bars to about 350 bars.

19. The process of claim 1 or 10, wherein the separation of oil of step (a) comprises the steps:
   (a) homogenization of said oil-, polar lipid-, and protein-containing mixture;
   (b) adding water-soluble organic solvent and water to said mixture;
   (c) homogenization of the mixture; and
   (d) separating the resulting mixture into an oil-rich fraction and a polar lipid/protein-rich fraction.

20. The process of any of claims 1, 3, or 10, wherein said oil-, polar lipid-, and protein-containing mixture is derived from eggs.

21. The process of any of claims 1, 3, or 10, wherein water-soluble organic solvent is recovered from the polar lipid-rich fraction and the protein-rich fraction after the density separation.

22. The process of any of claim 1, wherein said water-soluble organic solvent added in step (b) forms a water-soluble organic solvent/water mixture in which said water-soluble organic solvent comprises from about 20% to about 35% by weight of the total water-soluble organic solvent and water present.

23. The process of any of claim 1, wherein said water-soluble organic solvent added in step (b) forms a water-soluble organic solvent/water mixture in which said water-soluble organic solvent comprises from about 68% to about 98% by weight of the total water-soluble organic solvent and water present.

24. The process of any of claim 1, wherein said water-soluble organic solvent is recovered by countercurrent washing, evaporation or drying.

25. The process of any of claim 1, wherein said water-soluble organic solvent comprises a polar solvent.

26. The process of any of claims 1 or 3, 10, wherein said water-soluble organic solvent comprises an alcohol.

27. The process of any of claims 1 or 3, 10, wherein said water-soluble organic solvent comprises a $C_1$-$C_8$ alcohol.

28. The process of any of claim 1, wherein said water-soluble organic solvent comprises isopropanol, ethanol or mixtures thereof.

29. The process of any of claims 1, 3, 4, 5, 10 or 12, wherein said mixture is selected from a group consisting of eggs, fish, crustaceans, microbes, brain tissue, milk, meat and plant material including oilseeds.

30. The process of any of claim 1, wherein at least 60% of the polar lipids originally present in the mixture are recovered in a polar lipid-rich fraction.

31. The process of any of claim 1, wherein the temperature does not exceed 65° C. during the processing.

32. A process for recovering polar lipid from a polar lipid-containing mixture employing the use of a water-soluble organic solvent, wherein the relatively high solubility of polar lipid in an aqueous solution of the water-soluble organic solvent, in which the water-soluble organic solvent comprises less than 35 percent by weight or more than 68 percent by weight of the aqueous solution, is employed to assist in said recovery.

33. The process as claimed in claims 1 or 10, wherein said mixture is selected from a group consisting of eggs, fish, crustaceans, microbes, brain tissue, milk, meat and plant material including oilseeds.

34. The process of claim 1, wherein said polar lipid comprises a phospholipid.

35. The process of claim 1, wherein at least a portion of said process is performed in an oxygen-reduced atmosphere.

36. The process as claimed in any of claims 1 or 10, wherein the density separation that is performed to obtain a polar lipid-enriched fraction is conducted in two steps, wherein in the first step the proportion of the water-soluble organic solvent in the total water-soluble organic solvent and water present amounts to about 5% to about 35% by weight and the density separation results in a first polar lipid-enriched fraction, and wherein in the second step the proportion of the water-soluble organic solvent in the total water-soluble organic solvent and water present amounts to about 68% to about 98% by weight and the density separation results in a second polar lipid-enriched fraction, wherein the second polar lipid-enriched fraction contains a higher percentage of polar lipid than the first polar lipid-enriched fraction.

37. A process for fractionation of an oil-, polar lipid-, and protein-containing mixture, comprising the steps:
   (a) adding water-soluble organic solvent to said oil-, polar lipid-, and protein-containing mixture;
   (b) subjecting the oil-, polar lipid-, and protein-containing mixture to homogenization; and (c) separating oil from said mixture to form an oil-rich fraction and a polar lipid/protein-rich fraction;

wherein said homogenization is conducted at a pressure from about 100 bars to about 1,000 bars.

38. The process of claim 37, wherein steps (a), (b) and (c) comprise the steps:
(a) homogenization of said oil-, polar lipid-, and protein-containing mixture;
(b) adding water-soluble organic solvent and water to said mixture; and
(c) separating the resulting mixture into an oil-rich fraction and a polar lipid/protein-rich fraction.

39. The process of any of claims 37 or 38, wherein steps (a), (b) and (c) comprise the steps:
(a) adding water-soluble organic solvent and water to said mixture;
(b) homogenization of the water-soluble organic solvent and oil-, polar lipid-, and protein-containing mixture; and
(c) separating the resulting mixture into an oil-rich fraction and a polar lipid/protein-rich fraction.

40. The process of claim 37, wherein steps (a), (b) and (c) comprise the steps:
(a) homogenization of said oil-, polar lipid-, and protein-containing mixture;
(b) adding water-soluble organic solvent and water to said mixture;
(c) homogenization of the resulting mixture; and
(d) separating the resulting mixture into an oil-rich fraction and a polar lipid/protein-rich fraction.

41. The process of any of claims 37, 38 or 40, wherein said mixture is selected from a group consisting of eggs, fish, crustaceans, microbes, brain tissue, milk, meat and plant material including oilseeds.

42. The process as claimed in any of claim 37 wherein said oil-, polar lipid-, and protein-containing mixture is solubilized/dispersed in a water-soluble organic solvent and water mixture in which said water-soluble organic solvent comprises from about 5% to about 35% by weight of the total water-soluble organic solvent and water present.

* * * * *